United States Patent [19]
Coath

[11] Patent Number: 5,818,648
[45] Date of Patent: Oct. 6, 1998

[54] OPTICAL INSTRUMENT WITH AN ANTI-BACKLASH FOCUSING MECHANISM

[75] Inventor: Philip Michael Coath, Hockley, United Kingdom

[73] Assignee: Keymed Medical & Industrial Equipment, Ltd., Southend-On-Sea, United Kingdom

[21] Appl. No.: 809,586

[22] PCT Filed: Jul. 26, 1996

[86] PCT No.: PCT/GB96/01807

§ 371 Date: Mar. 24, 1997

§ 102(e) Date: Mar. 24, 1997

[87] PCT Pub. No.: WO97/09650

PCT Pub. Date: Mar. 13, 1997

[30] Foreign Application Priority Data

Sep. 1, 1995 [GB] United Kingdom .................. 9517889

[51] Int. Cl.$^6$ .............................. G02B 15/14; G02B 7/02
[52] U.S. Cl. .......................... 359/702; 359/700; 359/823
[58] Field of Search .................................. 359/699, 700, 359/701, 702, 823

[56] References Cited

U.S. PATENT DOCUMENTS

| 3,506,338 | 4/1970 | Holderbaum | 359/699 |
|---|---|---|---|
| 4,255,020 | 3/1981 | Yukio | 359/699 |
| 4,386,829 | 6/1983 | Sumi | 359/699 |
| 4,506,952 | 3/1985 | Grollimund | 359/823 |
| 5,515,205 | 5/1996 | Yokoyama et al. | 359/699 |

FOREIGN PATENT DOCUMENTS

| 027651 | 10/1980 | European Pat. Off. . |
|---|---|---|
| 066374 | 12/1982 | European Pat. Off. . |
| 506965 | 6/1939 | United Kingdom . |
| 1215594 | 8/1967 | United Kingdom . |
| 2168124 | 6/1986 | United Kingdom . |

*Primary Examiner*—Georgia Y. Epps
*Assistant Examiner*—Ricky Mack
*Attorney, Agent, or Firm*—Beveridge, DeGrandi, Weilacher & Young, LLP

[57] ABSTRACT

There is disclosed an anti-backlash focusing mechanism (10) for an optical instrument in which clearances between the focus control member (22) and the focusing lens cell (16) are eliminated. The mechanism (10) comprises a focusing lens means (16a) mounted in a first cylindrical member (16) which is slidable in a bore (12) in a housing (11). A focus control member (22) is rotatably mounted on the housing (11) and coupled to the first cylindrical member (16) such that rotation of the focus control member (22) causes axial movement of the first cylindrical member (16). A second cylindrical member (17) is provided adjacent the first, the second cylindrical member (17) also being coupled to the focus control member (22) for axial movement upon rotation of the latter. Biasing means (25,26) is provided to urge the first and second cylindrical members (16,17) together to eliminate clearances between them and the focus control member (22) and between the first and second cylindrical member (16,17) and the housing (11) and to prevent relative axial movement between the focus control member and the housing (11).

20 Claims, 1 Drawing Sheet

OPTICAL INSTRUMENT WITH AN ANTI-BACKLASH FOCUSING MECHANISM

FIELD OF THE INVENTION

The present invention relates to an optical instrument with a focusing mechanism designed to eliminate backlash. The present invention is described with particular reference to a focusing mechanism for a borescope or endoscope used for viewing a location inaccessible to or remote from the user but is applicable to other types of optical instrument.

BACKGROUND OF THE INVENTION

In order to provide a focused image for the user, there is normally provided at the proximal or "user" end of the instrument a housing or chassis member containing a focusing lens mounted in a cylindrical focusing lens cell, and a focus control member. The focusing lens cell is slidably received within the chassis and linked to the focus control member such that rotation of the focus control member moves the focusing lens cell axially so that a focused image can be provided for the user's eye or at the CCD in a CCTV camera or the film plane in a still camera.

Typically, the focus control member comprises a sleeve rotatably mounted on the chassis and having a helical groove in its interior surface. A pin projecting radially from the focusing lens cell extends through an axial slot in the chassis wall and engages in the helical groove. Accordingly, rotation of the focus control member causes axial movement of the focusing lens cell within the chassis.

For free movement of the focus control member and focusing lens cell, there have to be clearances between the components. Inevitably, this results in the phenomenon known as backlash. As the focusing control member is rotated one way or the other, the focusing lens cell only moves when all the clearances have been closed. Typically, the focus control member will have to be rotated by more than 3 degrees before the focusing lens cell starts to move. This is not usually a problem to the user of general borescopes. However, if the rotational position of the focus control member is required to be directly related to the position of the focusing lens cell, these clearances represent inaccuracy and unacceptable performance.

SUMMARY OF THE INVENTION

The present invention seeks to provide an anti-backlash focusing mechanism for an optical instrument in which the above mentioned clearances between the focus control member and the focusing lens cell are eliminated.

Accordingly, the present invention provides a focusing device for an optical instrument comprising focusing lens means mounted in a first cylindrical member located in a cylindrical bore in a housing, the first cylindrical member being slidable and constrained to move axially within the bore; focus control means comprising a sleeve rotatably mounted on the housing and a first coupling mechanism between the sleeve and the first cylindrical member whereby rotation of the sleeve causes axial movement of the first cylindrical member; the device further comprising a second cylindrical member also located in the bore of the housing adjacent to the first cylindrical member and being slidable and constrained to move axially with the bore; a second coupling mechanism between the sleeve and the second cylindrical member whereby rotation of the sleeve causes axial movement of the second cylindrical member synchronously with movement of the first cylindrical member; first biasing means urging the first and second cylindrical members towards each other to eliminate clearances between them and the sleeve and between the first and second cylindrical members and the housing and means to prevent relative axial movement between the sleeve and the housing.

Preferably, the first cylindrical member is constrained to move axially within the bore by means of a first pin projecting radially outwardly from the first cylindrical member and extending through a first axial slot in the wall of the housing.

The first coupling mechanism between the first cylindrical member and the sleeve preferably comprises a first helical slot formed in the sleeve in which the first pin engages.

Similarly, the second cylindrical member may be constrained to move axially within the bore by means of a second pin projecting radially outwardly from the second cylindrical member and extending through a second axial slot in the wall of the housing. Likewise, the second coupling mechanism between the second cylindrical member and the sleeve may comprise a second helical slot formed in the sleeve in which the second pin engages.

Preferably, the first and second axial slots are parallel to one another and are axially and circumferentially spaced from one another.

It is also preferable if the first and second helical slots are parallel to one another and axially and circumferentially spaced from one another.

Conveniently, the first biasing means comprises a spring means urging the first and second cylindrical members together. The spring means may comprise an extension spring which may be connected between the first and the second pins. This arrangement has the advantage that the effort required to rotate the focus control member is constant.

Preferably, the means to prevent relative axial movement between the sleeve and the housing comprises a second biasing means urging the sleeve into abutment with a stop member on the housing. Conveniently, the second biasing means also comprises spring means, which may be a compression spring mounted between the sleeve and a locking member located on the housing.

This system has the advantage that the focus control member and the focusing lens cell always move simultaneously, which is essential for any specialist borescope in which a linkage between the focus control member and the focusing lens cell has to be backlash free.

BRIEF DESCRIPTION OF THE DRAWING

The invention will now be described in detail, by way of example only, with reference to the accompanying drawings in which.

DETAILED DESCRIPTION OF THE PREFERRED EMBODIMENTS

As is well known in the art, an instrument for use as a borescope or endoscope comprises a tube, the distal end of which can be inserted into an inaccessible location. An optical system is provided in the tube to relay an image of an object at the inaccessible location to the proximal end of the tube. The proximal end of the tube terminates in a housing or body through which the user looks to view the image. A focusing mechanism is provided in the housing which is adjustable to present an in-focus image to the user.

Figure 1:
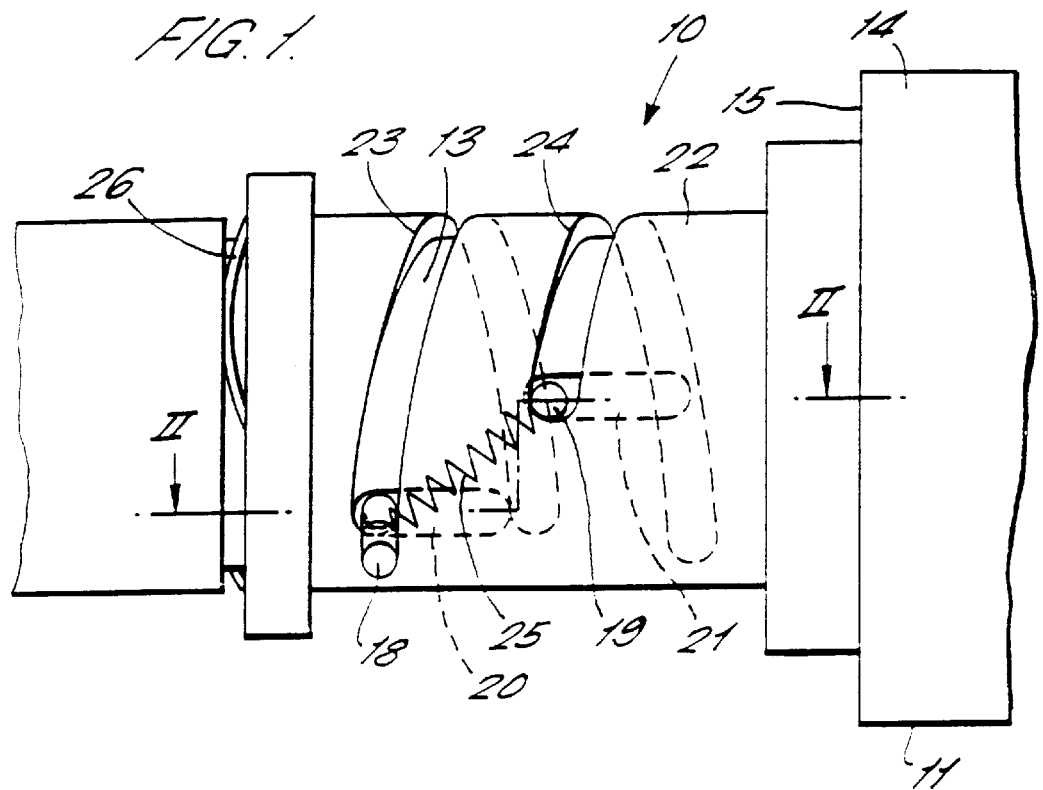
FIG. 1 is a side view of a focusing mechanism in accordance with the present invention.
Figure 2:
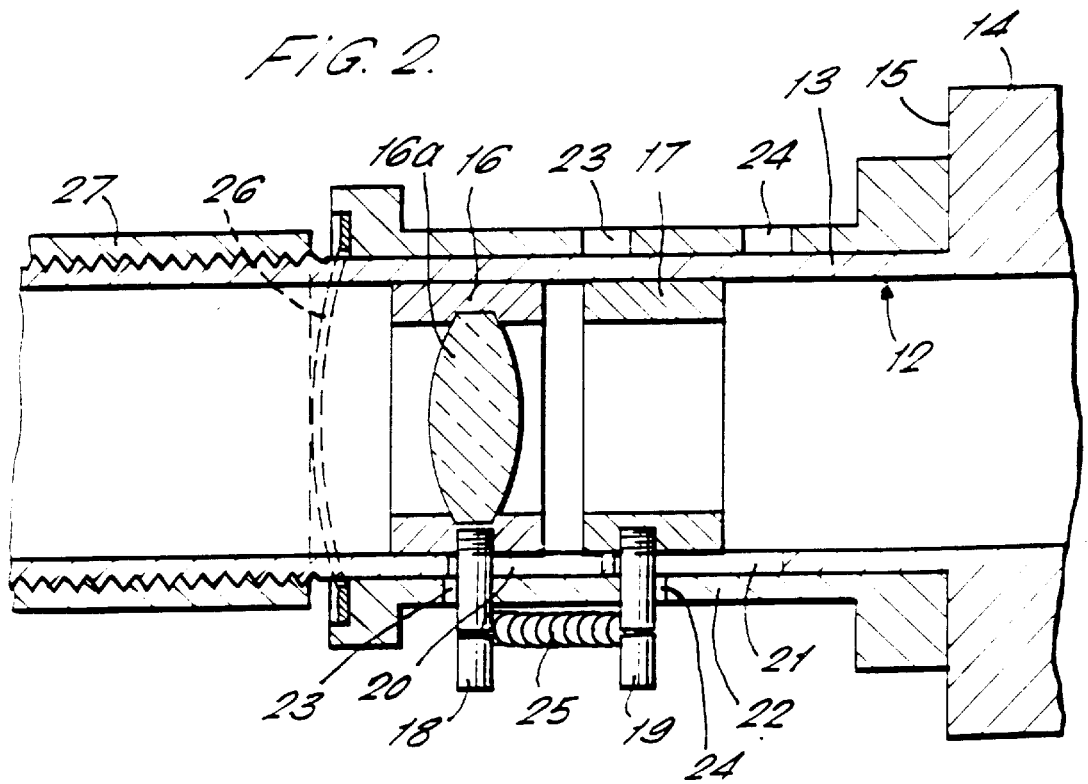
FIG. 2 is a section through the focusing mechanism of FIG. 1 along the II—II.

As shown in FIGS. 1 and 2, a focusing mechanism (10) in accordance with the present invention comprises a generally cylindrical housing or chassis member (11) having a cylindrical bore (12) extending through it. The proximal end of the chassis (11) is to the left hand side in the figures, while the distal end, to which in use the tube containing the image relaying system is connected, is to the right. The outer surface of the chassis (11) comprises a smaller diameter portion (13) and a larger diameter portion (14) arranged distally of the small diameter portion (13) and separated from it by a shoulder (15).

Slidably received within the bore (12) of the smaller diameter portion (13) of the chassis (11) is a focusing lens cell comprising a cylindrical member (16) in which focusing lens means, here shown as single lens (16a), is fixed. Distally adjacent to the cylindrical lens cell (16) is a second cylindrical member (17) also slidably received in the bore (12). The chassis (11), focusing lens cell (16) and the cylindrical member (17) are all coaxial with one another. In this embodiment, the lens cell (16) and second cylindrical member (17) have the same outside diameter.

Both the lens cell (16) and the second cylindrical member (17) have a respective pin (18,19) fixedly secured thereto and projecting radially outwardly. Each pin (18,19) extends through a respective axial slot (20,21) formed in the wall of the smaller diameter portion (13) of the chassis (11). The axial slots (20,21) are parallel and are formed axially and circumferentially spaced from one another, as is shown most clearly in FIG. 1.

A focus control member (22) in the form of a sleeve is rotatably mounted on the smaller diameter portion (13) of the chassis (11) adjacent the shoulder (15).

A pair of parallel helical slots (23,24) are formed in the focus control member (22). These slots have the same lead characteristic and the starts of the two slots are separated axially and circumferentially from one another by an amount depending on the optical specification and physical dimensions of the instrument.

The pin (18) secured to the focusing lens cell (16) extends through the helical slot (23) which is closest to the proximal end of the focus control member (22). Thus, a first coupling mechanism (18,23) between focusing lens cell (16) and focus control member (22) comprises, in the illustrated embodiment, a first helical slot (23) formed in sleeve (22) in which first pin (18) engages. The pin (19) secured to the second cylindrical member (17) extends through the other helical slot (24) nearest to the distal end of focus control member (22). Thus, a second coupling mechanism (19,24) between second cylindrical member (17) and sleeve (22) comprises a second helical slot (24) formed in sleeve (22) in which second pin (19) engages. The heads of the two pins (18,19) protrude outwardly from the helical slots (23,24).

A first biasing means in the form of an extension spring (25) is attached between the heads of two pins (18,19) and extends across the outer surface of the focus control member (22). The spring (25) therefore urges the two cylinders (16,17) towards each other and eliminates any clearances between them and the focus control member (22) and between the two cylinders (16,17) and the chassis (11). The spring force urging the two cylinders (16,17) towards each other is constant due to the similar lead characteristics of the two slots (23,24) in the focus control member (22).

Means (26) is also provided to prevent relative axial movement between the focus control member (22) and the chassis (11). In this embodiment, this second biasing means comprising a compression spring (26) located between the proximal end of the focus control member (22) and a locking ring member (27) mounted on the chassis (11), which spring (26) urges the focus control member (22) into abutment with the shoulder (15).

The second biasing means is illustrated in the form of a spring ring but any form of spring means which will urge the focus control member (22) and the shoulder (15) together may be used.

In this way, clearances between the components of the focusing mechanism and hence any backlash are eliminated. Rotation of the focus control member (22) causes simultaneous axial movement of the second cylindrical member (17) and lens cell (16), and axial movement of the two cylinders cannot occur in the absence of rotation of the focus control member.

I claim:

1. Focusing device for an optical instrument comprising focusing lens means mounted in a first cylindrical member located in a cylindrical bore in a housing, the first cylindrical member being slidable and constrained to move axially within the bore; focus control means comprising a sleeve rotatably mounted on the housing and a first coupling mechanism between the sleeve and the first cylindrical member whereby rotation of the sleeve causes axial movement of the first cylindrical member; the device further comprising a second cylindrical member also located in the bore of the housing adjacent to the first cylindrical member and being slidable and constrained to move axially with the bore; a second coupling mechanism between the sleeve and the second cylindrical member whereby rotation of the sleeve causes axial movement of the second cylindrical member synchronously with movement of the first cylindrical member; first biasing means urging the first and second cylindrical members towards each other to eliminate clearances between them and the sleeve and between the first and second cylindrical members and the housing and means to prevent relative axial movement between the sleeve and the housing.

2. A focusing device as claimed in claim 1, wherein the first cylindrical member is constrained to move axially within the bore by means of a first pin projecting radially outwardly from the first cylindrical member and extending through a first axial slot in the wall of a housing.

3. A focusing device as claimed in claim 2, wherein the first coupling mechanism between the first cylindrical member and the sleeve comprises a first helical slot formed in the sleeve in which the first pin engages.

4. A focusing device as claimed in claim 3, wherein the second cylindrical member is constrained to move axially within the bore by means of a second pin projecting radially outwardly from the second cylindrical member and extending through a second axial slot in the wall of the housing.

5. A focusing device as claimed in claim 4, wherein the second coupling mechanism between the second cylindrical member and the sleeve comprises a second helical slot formed in the sleeve in which the second pin engages.

6. A focusing device as claimed in claim 5, wherein the first and second helical slots are parallel to one another and axially and circumferentially spaced from one another.

7. A focusing device as claimed in claim 5, wherein the first and second axial slots are parallel to one another and are axially and circumferentially spaced from one another.

8. A focusing device as claimed in claim 7, wherein the first and second helical slots are parallel to one another and axially and circumferentially spaced from one another.

9. A focusing device as claimed in claim 4, wherein the first and second axial slots are parallel to one another and are axially and circumferentially spaced from one another.

10. A focusing device as claimed in claim 4, wherein said first biasing means includes an extension spring which is attached to the first and second pins.

11. A focusing device as claimed in claim 2, wherein the second cylindrical member is constrained to move axially within the bore by means of a second pin projecting radially outwardly from the second cylindrical member and extending through a second axial slot in a wall of the housing.

12. A focusing device as claimed in claim 11, wherein said first biasing means comprises an extension spring attached to said first and second pins.

13. A focusing device as claim 1, wherein the first biasing means comprises spring means urging the first and second cylindrical members together.

14. A focusing device as claimed in claim 13, wherein the spring means comprises an extension spring connected between the first and second cylindrical members.

15. A focusing device as claimed in claim 13, wherein the means to prevent relative axial movement between the sleeve and the housing comprises a second biasing means urging the sleeve into abutment with a stop member on the housing.

16. A focusing device as claim 1 wherein the means to prevent relative axial movement between the sleeve and the housing comprises an axial movement biasing means urging the sleeve into abutment with a stop member on the housing.

17. A focusing device as claimed 16 wherein the axial movement biasing means comprises spring means urging the sleeve into abutment with the stop member.

18. A focusing device as claimed in 17, wherein the spring means comprises a compression spring mounted between the sleeve and a locking member located on the housing.

19. Apparatus for use as a borescope or endoscope for inspection of an inaccessible object, comprising a tube having a distal end which is insertable in use into an inaccessible location and a proximal end which is accessible to the user; an optical system to relay an image of an object from the distal end to the proximal end of the tube and a housing at the proximal end of the tube having a bore through which the user views the image, wherein the apparatus further comprises a focusing device in accordance claim 1 located in the housing.

20. An apparatus as claimed in claim 19, wherein the first cylindrical member is constrained to move axially within the bore by means of a first pin projecting radially outwardly from the first cylindrical member and extending through a first axial slot in a wall of the housing, wherein the first coupling mechanism between the first cylindrical member and the sleeve comprises a first helical slot formed in the sleeve in which the first pin engages, wherein the second cylindrical member is constrained to move axially within the bore by means of a second pin projecting radially outward from the second cylindrical member and extending through a second axial slot in the wall of the housing, wherein the second coupling mechanism between the second cylindrical member and the sleeve comprises a second helical slot formed in the sleeve in which the second pin engages, and wherein said first biasing means includes a spring connected to said first and second pins.

* * * * *